Dec. 12, 1950          C. B. ESTES          2,533,441
SLIDE CHANGING DEVICE
Filed April 2, 1948
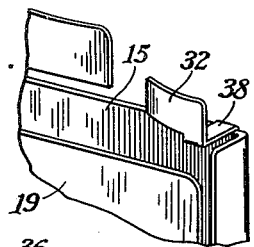
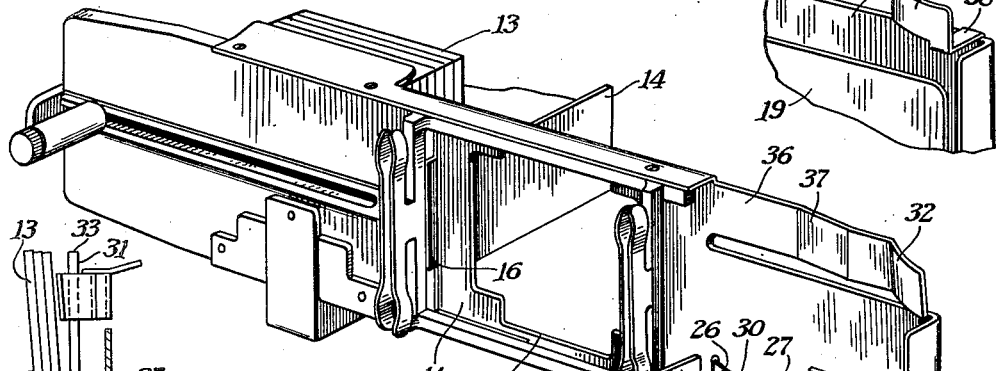
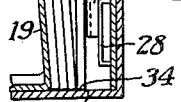
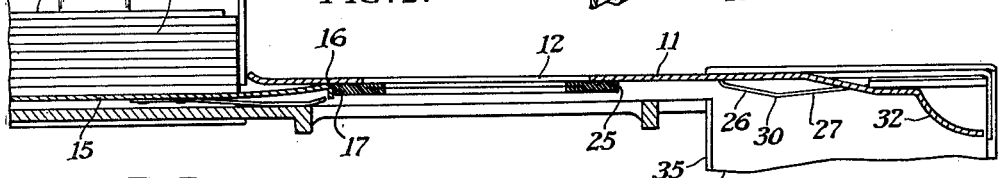
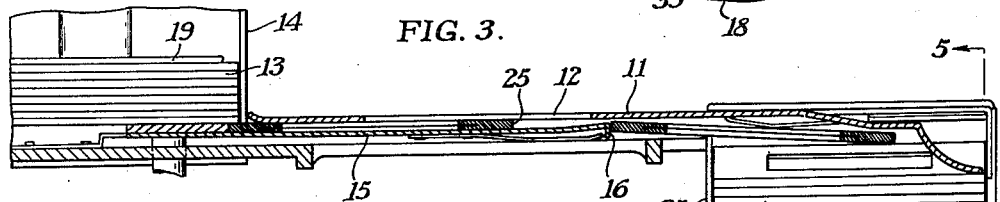
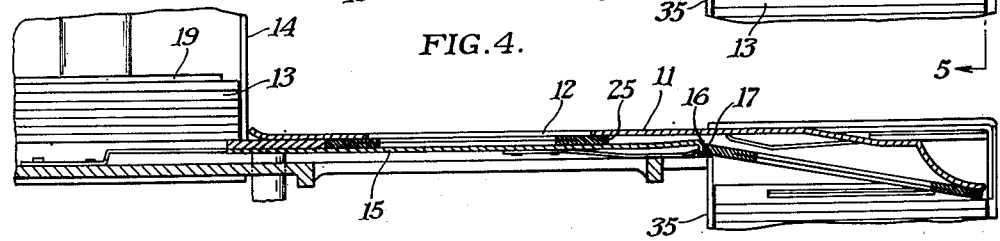
CAMERON B. ESTES
INVENTOR
BY
ATTORNEYS

UNITED STATES PATENT OFFICE 2,533,441

SLIDE CHANGING DEVICE

Cameron B. Estes, Rochester, N. Y., assignor to Eastman Kodak Company, Rochester, N. Y., a corporation of New Jersey Application April 2, 1948, Serial No. 18,579

4 Claims. (Cl. 88—28)

The present invention relates to projectors, and more particularly to a slide changing device by which transparencies or slides may be moved into and out of projecting position.

Many types of slide-changing devices are formed with a plate provided with a central projection aperture adapted to be arranged in alignment with the optical axis of the projector. One end of this plate has formed integral therewith, or suitably secured thereto, a supply magazine adapted to hold a group of slides to be projected. The other end of the plate carries a take-up magazine into which the slides are discharged or ejected after projection. Followers of one form or another are positioned in the magazines to maintain the slides in stacked relation therein. A slide-changing member is reciprocally mounted on the plate and is adapted to move slides from the supply magazine into registry with the projection aperture. After the slides have been projected the member is moved along the plate to shift the previously projected slide out of registry with the projection aperture and move it into the take-up magazine where the slides are arranged in a vertical stacked relation and parallel to the slide-changing member.

With the slides so arranged in the take-up magazine, when the next slide is fed thereinto by the slide-changing member, this next slide will be moved parallel to and will slide along substantially the entire face of the adjacent slide in the magazine. The result is that this incoming slide often catches and/or jams on the adjacent slide, the disadvantage of which will be readily apparent to those familiar with such mechanisms. In order to overcome this difficulty, the present invention provides an arrangement by which all of the slides in the take-up magazine are held in a backwardly tilted or inclined position. The result is that the incoming slide will engage the adjacent slide in the take-up magazine only adjacent the bottom edge thereof, thus effectively eliminating catching or jamming. Near the end of its movement, the incoming slide finally engages a deflecting member which serves to deflect the slide from its vertical position, and to tip or tilt the slide into a backwardly inclined relation.

The present invention has, therefore, as its principal object the provision of an arrangement by which jamming of the slides in the take-up magazine is effectively eliminated.

Still another object of the invention is the provision of an arrangement for supporting slides in the take-up magazine to facilitate the feeding of slides thereinto.

Yet another object of the invention is the provision of a slide-positioning means in the take-up magazine which is simple, rugged, and highly effective in use.

To these and other ends, the invention resides in certain improvements and combinations of parts, all as will be hereinafter more fully described, the novel features being pointed out in the claims at the end of the specification.

In the drawings:

Fig. 1 is a perspective view of one form of a slide-changing device, showing the relation thereto of a slide-positioning member constructed in accordance with the present invention;

Fig. 2 is a horizontal sectional view through the device illustrated in Fig. 1, showing the relation thereto of a slide-positioning member of the present invention with a slide in the projecting position;

Fig. 3 is a view similar to Fig. 2, but showing the slides arranged in an inclined stacked relation in the take-up magazine, and the relation of the stacked slides to an incoming slide;

Fig. 4 is a view similar to Fig. 3, but showing the action of the positioning member of the present invention in tipping or tilting the incoming slide;

Fig. 5 is an end view of the device illustrated in Fig. 3 and taken substantially on line 5—5 thereof, showing the relation of the incoming slide to the stacked slides in the take-up magazine; and Fig. 6 is a partial perspective view of a slide-changing device, showing a modified form of a slide-positioning member.

Similar reference numerals throughout the various views indicate the same parts.

The slide-positioning member of the present invention is shown as applied to a slide-changing mechanism or device of the type illustrated and described in the patent to Young No. 2,213,779, issued September 3, 1940. This device is, however, shown for illustration purposes only and is not intended as a limitation, as the positioning member of the present invention is adapted for use with a wide range of slide-changing devices. As the slide-changing device, per se, does not constitute a part of the present invention, only so much as is necessary for a full and complete understanding of the present invention will be described. Reference may be had to the above-mentioned Young patent for a complete illustration and description of one form of slide-changing mechanism with which the positioning member of the present invention may be used.

The slide-changing device comprises broadly a plate 11 formed with a central projection aperture 12 adapted to be arranged in optical alignment with the optical axis of the projector and with which the slides, indicated at 13, register when in projecting position. One end of the plate 11 has secured thereto or formed integral therewith a supply magazine 14 in which the slides 13 are arranged in a stacked relation prior to projection. The slides 13 are selectively moved out of the supply magazine and into registration with the projection aperture 12 by means of a slide changer 15 reciprocally mounted on the plate 11. After the slide has been projected, the changer 15 is moved to the right to bring the leading edge 16 thereof into engagement with the trailing edge 17 of the slide in registry with the projection aperture, as shown in Fig. 2. Further rightward movement of the changer 15 will serve to shift the slide 13 along the plate 11 and finally into a take-up magazine 18 secured to or formed integral with the other end of the plate 11. Spring-pressed followers 19 are positioned in the magazines 14 and 18 to retain the slides in position therein.

As the slide 13 is moved from the position shown in Fig. 2 to that shown in Fig. 3, the leading edge 25 of the slide finally contacts an inclined or cam portion 26 formed on the free end of a guide in the form of a cantilever spring 27 positioned in the take-up magazine and having the other end 28 anchored to the plate 11, adjacent to bottom 29 of the take-up magazine, as best shown in Fig. 1. Such an engagement will cause the leading edge 25 of the slide to move along portion 26 and to be deflected downwardly, as shown in Figs. 3 and 4. Continued movement of the slide will finally bring the latter into engagement with a high point 30 on the spring, the trailing edge 15 of the slide still contacting edge 16 of the slide changer. Continued movement of the slide changer will move the slide 13 along the point 30 until a position is finally reached at which the slide will suddenly pivot on the point 30, and will move out of the plane of and will be arranged parallel to the slide when in projecting position as shown in Fig. 2. In this position, however, the edge 16 of the slide changer will still be in engagement with the trailing edge of the slide.

As the changer 15 is moved further to the right, the upper portion 31 of the leading edge 25 of slide 13 will finally engage a fixed inclined cam 32 of a shape best shown in Fig. 1. This cam will gradually move or cam the leading edge 25 downwardly, as viewed in Fig. 3, or to the left as viewed in Fig. 5. Near the end of this movement, the slide will be positioned as shown in Fig. 4 with the leading edge 25 positioned by the cam rearwardly of the spring 27 which is still in engagement with the lower portion of the slide, as shown in Fig. 5. The slide is finally moved until its trailing edge 17 finally registers with the inner surface of the left wall 35 of the take-up magazine, whereupon the spring 27 snaps the lower portion of the slide into engagement with the adjacent slide in the magazine. The upper portion of the slide is now held back of the cam 32 while the lower portion is in engagement with the spring 27, as is apparent from an inspection of Fig. 5. However, as the cam 32 is positioned rearwardly of the spring 27, the slide will be arranged in a backwardly tilted or inclined relation in the take-up magazine. As the next slide is moved into the take-up magazine, the leading edge 25 will finally engage the cam 32 which will finally tip or tilt the slide rearwardly. The cam 32 cooperates with the spring 27 to retain the slide in the inclined relation. The follower in the take-up magazine is preferably inclined rearwardly, as shown in Fig. 5, to support the inclined slide.

Thus, as the slides are moved successively into the take-up magazine, they will be arranged therein automatically in an inclined stacked relation. Now, as a new slide is fed into the magazine it will engage the previously positioned slide adjacent to lower edge 34 only, the major portion of the slide being out of contact relation with the adjacent slide in the magazine, as clearly illustrated in Fig. 5. Thus the slides contact over a minimum area, and as neither the leading edge nor the aperture of the incoming slide engages the aperture portion in the adjacent slide, catching and jamming of the slides is eliminated, the advantages of which are deemed apparent to those familiar with devices of this type.

In the preferred arrangement, the cam 32 is positioned on the free end of a cantilever tongue or finger 36 formed on the plate 11, as clearly illustrated in Fig. 1. This finger is provided with an inclined portion 37 which may cooperate with the spring 27 in guiding the slide prior to the engagement thereof with the cam 32. In the modified arrangement shown in Fig. 6, the cam 32 is independent of the finger 36 and is formed on the end of a bracket 38 which is secured to the back of the plate 11 in any suitable and well known manner.

The present invention thus provides a slide-positioning member in the form of a cam arranged in a take-up magazine and adapted to engage each slide, near the end of its movement, to tip or tilt the slide backwardly. This member also serves to hold the slides in their tipped relation so as to prevent the catching or jamming of incoming slides to facilitate the injecting of the slides into the take-up magazine. This cam or positioning member is simple in construction, rugged, inexpensive to manufacture and highly effective in use.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a slide changing device, the combination with an apertured plate, a take-up magazine secured to one end of said plate to receive slides after projection, means slidably mounted on said plate for moving slides out of projecting position and into said magazine, a guide positioned in said magazine to engage incoming slides to deflect the latter out of the plane of said moving means, of a stationary member carried by said magazine and positioned beyond said guide to be engaged by the upper portion only of the leading edge of a deflected slide being fed into said moving means to tip said slide into an inclined position in said magazine, said member cooperating with said guide to retain said slides in an inclined relation in said magazine.

2. In a slide changing device, the combination with an apertured plate, a take-up magazine secured to one end of said plate to receive slides after projection, means slidably mounted on said plate for moving slides out of projecting position and into said magazine, a guide positioned in said magazine to engage incoming slides to deflect the latter out of the plane of said moving means and to eject the slides into said magazine, of a cam carried by said magazine beyond and out of the plane of said guide and positioned in the path of the upper portion only of the leading edge of a slide to engage the latter as it is fed into said magazine and just before ejection by said guide to tilt the upper portion of the slide to arrange the latter in an inclined relation in said magazine, said member cooperating with said guide to hold said slide in said inclined relation.

3. In a slide changing device, the combination with an apertured plate, a take-up magazine secured to one end of said plate to receive slides after projection, means slidably mounted on said plate for moving slides out of projecting position and into said magazine, a guide positioned in said magazine to engage incoming slides to deflect the latter out of the plane of said moving means and to eject the slides into said magazine, of a cam carried by said magazine and positioned in the path of the upper portion only of the leading edge of a slide as the latter is fed into said magazine and just before ejection by said guide to tilt the upper portion of the slide to arrange the latter in an inclined relation in said magazine and to cooperate with said guide to hold said slides in said relation.

4. In a slide changing device, the combination with an apertured plate, a take-up magazine secured to one end of said plate to receive slides after projection, means slidably mounted on said plate for moving slides out of projecting position and into said magazine, a guide positioned in said magazine to engage incoming slides to deflect the latter out of the plane of said moving means and to eject the slides into said magazine, of a fixed deflecting member carried by the upper part of said magazine and positioned beyond said guide so as to engage only the upper portion of a slide after it has been deflected by said guide, said member being positioned out of the plane of said guide so as to tilt said slide as the latter is ejected by said guide.

CAMERON B. ESTES.

REFERENCES CITED

The following references are of record in the file of this patent:

UNITED STATES PATENTS

| Number | Name | Date |
|---|---|---|
| 306,528 | Samuels | Oct. 14, 1884 |
| 926,662 | London | June 29, 1909 |
| 1,093,401 | Gottlieb | Apr. 14, 1914 |
| 2,213,779 | Young | Sept. 3, 1940 |
| 2,310,047 | Waldeyer | Feb. 2, 1943 |
| 2,442,365 | Leming | June 1, 1948 |

FOREIGN PATENTS

| Number | Country | Date |
|---|---|---|
| 50,102 | Germany | Dec. 28, 1889 |
| 11,149 | Great Britain | of 1892 |
| 218,686 | Switzerland | Dec. 31, 1941 |